March 24, 1931.  R. H. HELSEL  1,797,771

CHECK PUNCHING AND ISSUING MACHINE

Filed May 4, 1926  8 Sheets-Sheet 1

Fig. 1.

INVENTOR
REUBEN H. HELSEL
BY
Marshall & Hawley
ATTORNEYS.

March 24, 1931.   R. H. HELSEL   1,797,771
CHECK PUNCHING AND ISSUING MACHINE
Filed May 4, 1926   8 Sheets-Sheet 2

Fig. 2.

INVENTOR
REUBEN H. HELSEL
BY
Marshall & Hawley
ATTORNEYS.

March 24, 1931.  R. H. HELSEL  1,797,771
CHECK PUNCHING AND ISSUING MACHINE
Filed May 4, 1926   8 Sheets-Sheet 3

Fig. 3

INVENTOR
REUBEN H. HELSEL
BY
Marshall & Hawley
ATTORNEYS

March 24, 1931. R. H. HELSEL 1,797,771

CHECK PUNCHING AND ISSUING MACHINE

Filed May 4, 1926 8 Sheets-Sheet 6

INVENTOR
REUBEN H. HELSEL
BY
Marshall & Hawley
ATTORNEYS

INVENTOR
REUBEN H. HELSEL
BY
Marshall & Hawley
ATTORNEYS.

March 24, 1931.   R. H. HELSEL   1,797,771
CHECK PUNCHING AND ISSUING MACHINE
Filed May 4, 1926   8 Sheets-Sheet 8

Fig.11.

INVENTOR
REUBEN H. HELSEL
BY
Marshall & Hawley
ATTORNEYS.

Patented Mar. 24, 1931

1,797,771

UNITED STATES PATENT OFFICE

REUBEN H. HELSEL, OF LONG ISLAND CITY, NEW YORK, ASSIGNOR, BY MESNE ASSIGNMENTS, TO GENERAL REGISTER CORPORATION, OF BROOKLYN, NEW YORK, A CORPORATION OF PENNSYLVANIA

CHECK PUNCHING AND ISSUING MACHINE

Application filed May 4, 1926. Serial No. 106,632.

This invention relates to check issuing machines, and particularly to machines for punching and issuing checks such as are used in restaurants although it should be understood that the machine is not limited to any such specific use.

One of the objects of the invention is to provide a check punching and issuing machine that is simple in construction, compact in arrangement and can be economically manufactured.

Another object of the invention is to provide a machine of the character described so constructed that the depression or operation of a key or a plurality of keys will render the functioning of the machine automatic and cause the various operative parts to complete their cycles of movement and return to their initial positions.

Another object of the invention is to provide a machine for punching and issuing checks with counter mechanism so connected to the operative parts of the machine that the counter will indicate after the issuance of each check the total amount covered by the issued checks.

Another object of the invention is to provide keys for locking the machine and selector keys against operation when there is no strip or check in position to be punched or operated upon.

Another object of the invention is to provide a machine of the character described having its parts so relatively constructed and arranged and having the casing so constructed that ready access can be had to the operative parts.

Further objects of the invention will appear from the following specification taken in connection with the drawings, which form a part of this application, and in which—

The invention briefly described consists of a machine having a plurality of sets of selector keys and punch mechanism for each set of keys operative upon a check to indicate thereon the amount purchased. The keys of each set are constructed and arranged to set in operation a plurality of operative parts which after being set in operation, function automatically, complete their cycles of operation and return to their initial position. Upon the depression of one of the keys in one of the sets of keys, the punch mechanism is moved to operative position corresponding to the key depressed and a motor is set in operation. The motor is geared to an operating shaft which by means of various cams causes the actuation of the punch mechanism, the feeding of the check strip, the severing of a check from a strip of checks and the return of the various operative parts to their position of rest or to their initial positions. Means is provided for automatically connecting the operating shaft to the motor drive upon the depression of a key and for automatically disconnecting the shaft from the motor drive when the various parts have completed their cycles of operation and returned to their initial positions. Means is also provided for locking the check strip feeding mechanism during the punching and check severing operations and for releasing this locking means when the check strip is fed subsequent to the punching operation.

The mechanism also includes a counter and is so constructed and arranged that the counter will be operated during the punching and issuing of each check or ticket and will indicate after each check or ticket has been delivered or issued, the exact total of the amounts covered by the issued checks.

The machine is also provided with means for locking the keys and operative parts against movement when the check or ticket strip is exhausted.

Further details of the invention will appear from the following description.

In the embodiment of the invention illustrated, the machine is used in a casing having a bottom 20, a front wall 21 extending upwardly for a portion of the length of the casing, a rear wall 22 and side walls 23 and 24. These parts can be made and secured together in any desired manner, as by screws 25 (see Figs. 2 and 5).

The casing has secured therein partitions 26, 27, 28 and 29, the operative mechanism being mounted on these partitions or frame members and the partitions being securely connected to the casing and also being connected together by shafts, spindles and other parts hereinafter described.

Selector keys and control bars

Figure 7:
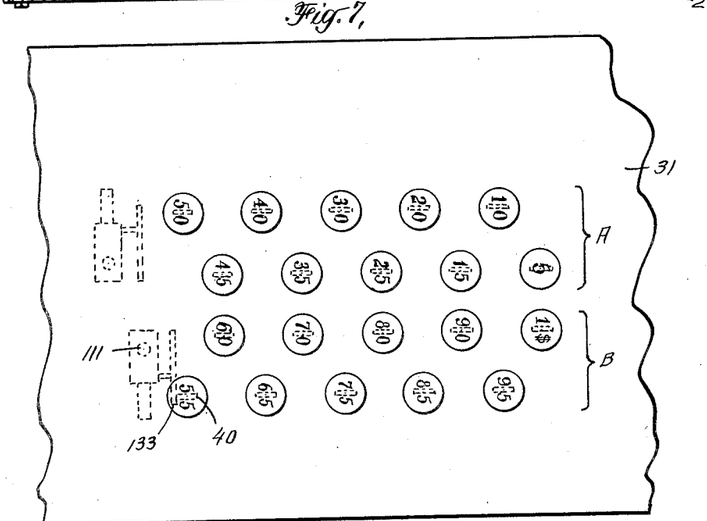
Fig. 7 is a fragmentary development of the top of the keyboard showing in dotted lines the punch mechanism, arrested by key "55", of one of the sets of keys, but the other punch mechanism being disposed in inactive position.

A plurality of sets of selector keys indicated on Fig. 7 as A and B are carried by a cover 31 which encloses the upper front portion of the casing and can be locked thereon by a bolt 32. The bolt 32 engages a slot 33 formed in the upper portion of the partitions 27—28. The locking bolt is carried by the cover 31 and when the bolt is moved into the slot 33, the cover is securely locked in position.

Figure 2:
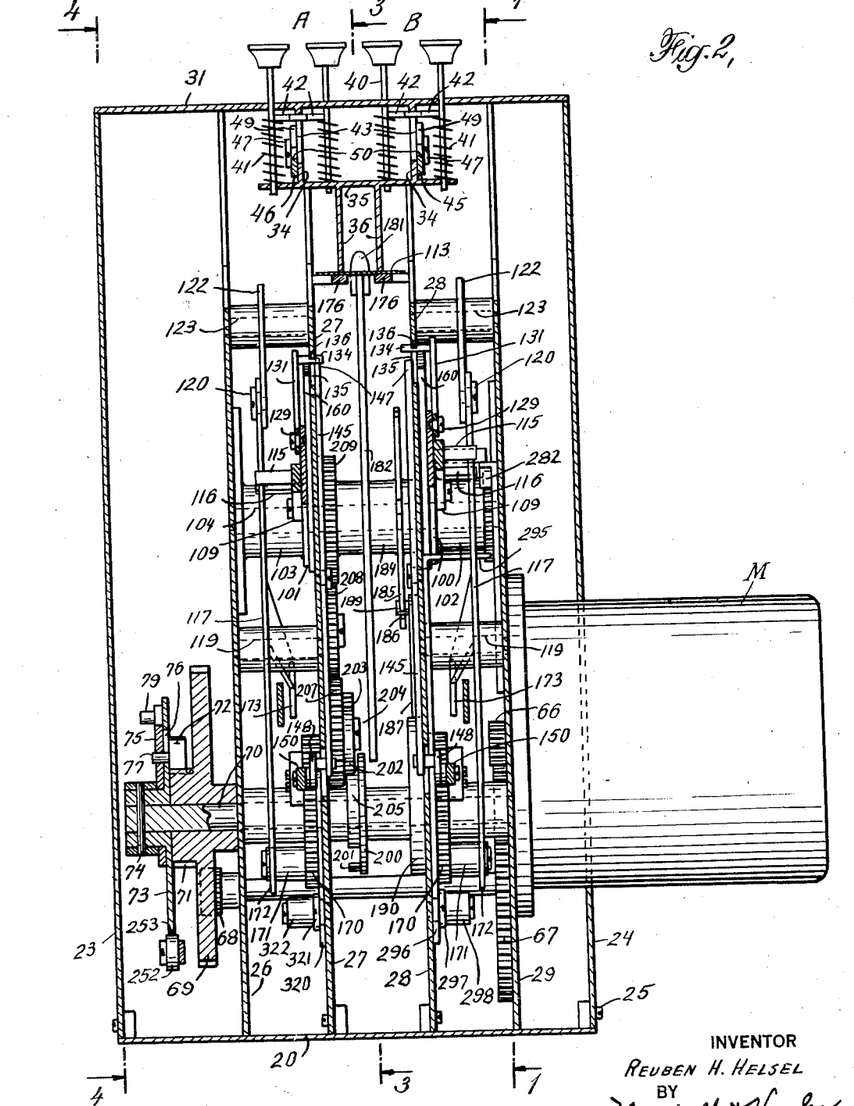
Fig. 2 is a sectional front elevation taken substantially on line 2—2 of Fig. 1.

As shown in Fig. 2, the cover 31 has formed thereon or secured thereto downwardly extending webs 34 and a plate 35 curved in section and corresponding in curvature to the cover 31, is secured to the lower ends of the webs 34. Parallel webs 36 extend inwardly or downwardly from the plates 35 and are disposed between the upper portions of the partitions 27 and 28.

The keys 40 are slidably mounted in the cover 31 and plate 35 and are normally resiliently retained in their extended position as shown in Fig. 2 by means of springs 41, which engage the plate 35 at their inner ends and engage at their outer ends laterally extending lugs or pins 42 carried by the keys.

The pins 42 are limited in their movement by means of slots 43 formed in the webs 34, the outer ends of the pins being disposed in the slots. The pins and slots also form additional guides for the keys 40.

The entire operating mechanism of the machine is controlled by a pair of control bars 45 and 46. These bars are carried by the webs 34 and are slidably mounted thereon by means of pins or screws 47 which are secured to the web and extend through slots 48 formed in the control bars.

Figure 4:
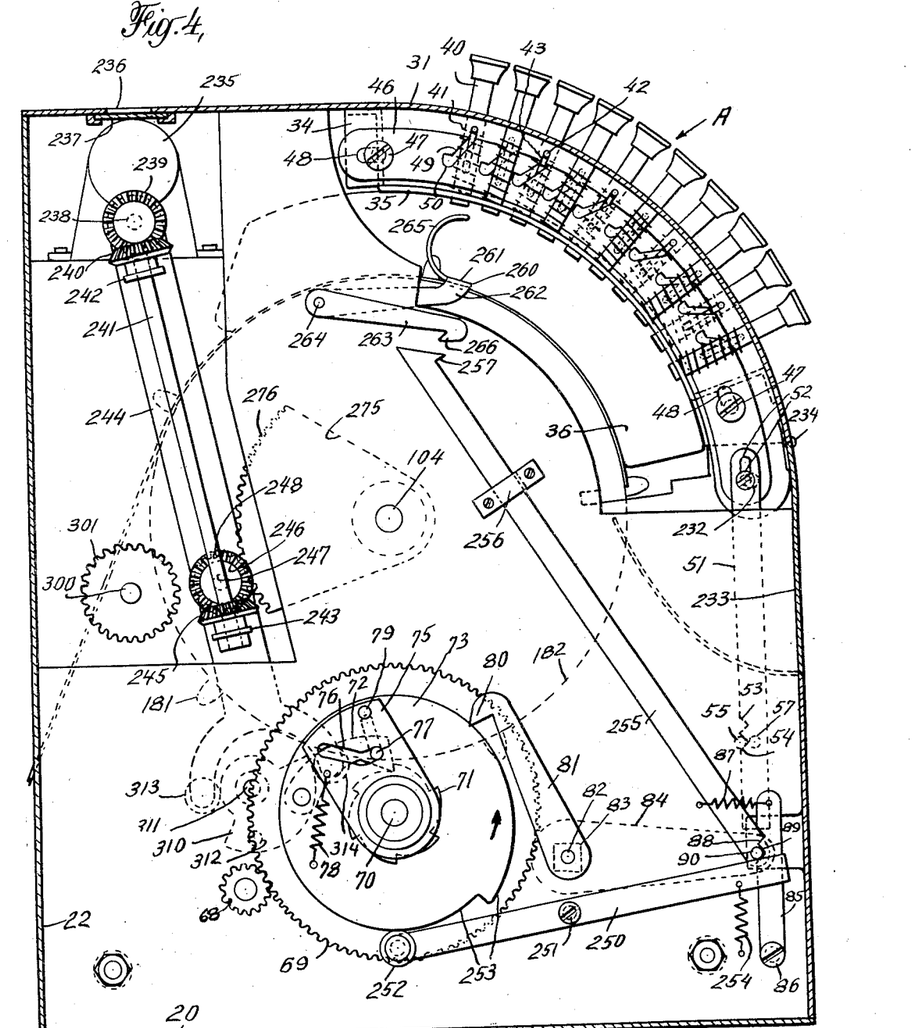
Fig. 4 is a sectional elevation taken substantially on line 4—4 of Figs. 2 and 5.

Each of the bars has formed in its upper edge a plurality of inclined elongated notches 49, the outer ends of these notches being normally disposed as shown in Fig. 4 in position to receive the end portions of the pins 42 carried by the keys 40. The notches at their inner ends are enlarged or recessed as shown at 50.

Figure 1:
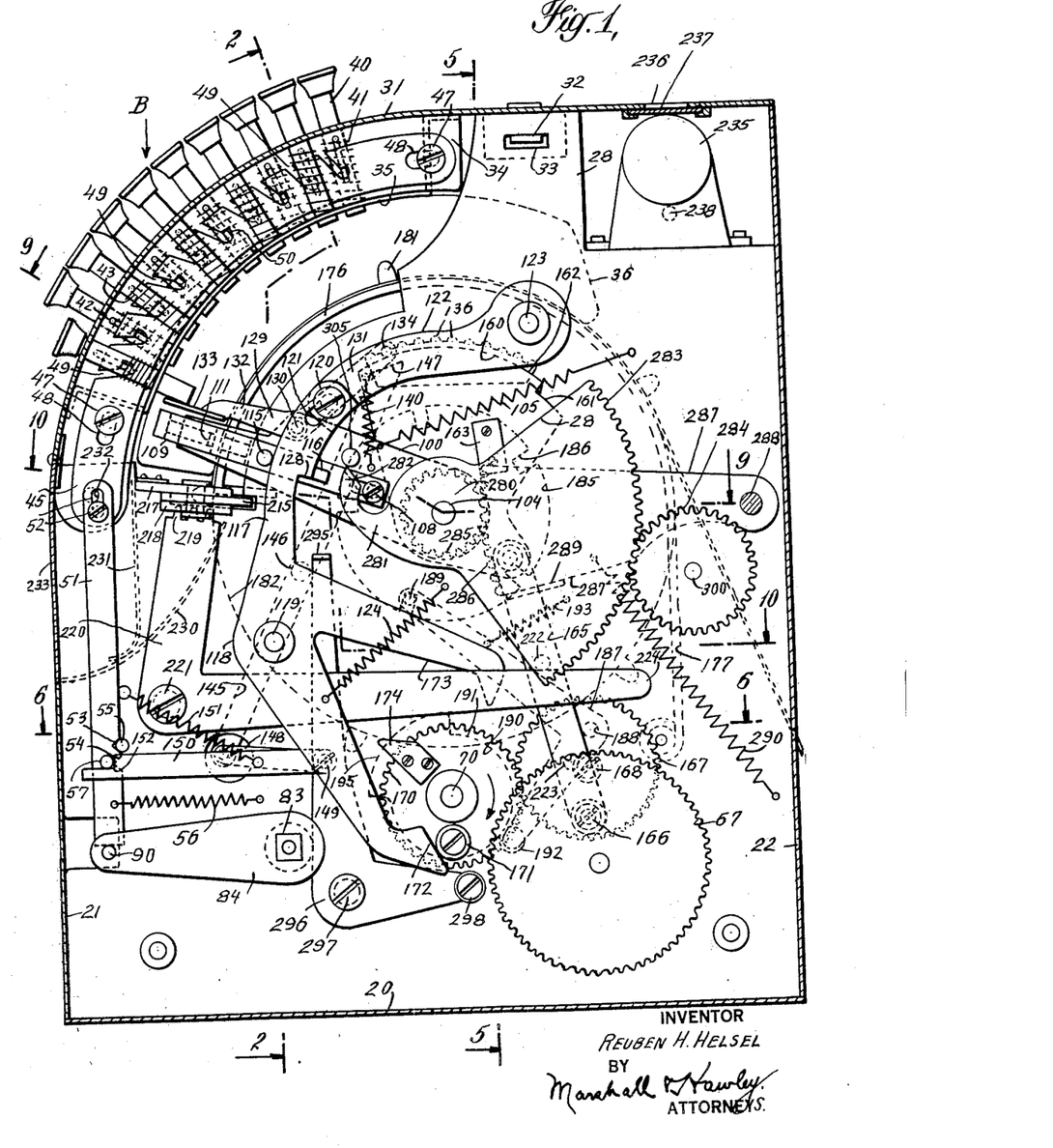
Fig. 1 is a sectional side elevation taken substantially on line 1—1 of Figs. 2 and 5.

In operation when one of the keys of the set B is depressed, the pin 42 carried by the shank of the key will enter the notch disposed opposite the pin and because of the inclination of the notch will cause the control bar 45 to be depressed to the position shown in Fig. 1. This depression of the control bar sets in operation the various operative parts of the machine, causing these parts to move through their cycles of movement and to return to their initial positions without further attention by the operator. Attention is called to the fact that when one of the keys has been depressed, shifting the bar, the pin 42 of that key will be disposed in the recess 50, thereby preventing the key from returning to its initial position and also the shifting of the bar will dispose the portions of the bar between the notches beneath the other pins 42, thereby preventing operation thereof.

Each of the control bars 45, 46 has secured to its lower end an arm 51 and the two arms 51 are slotted at their upper ends and are connected to the bars by a pin and slot connection as shown at 52.

Each arm 51 has two notches 53, 54 on its inner edge, adapted to receive a pin 55 projecting from partition 27 or from partition 28. The arms are engaged by and held against the pins 55 by springs 56. Each arm also has a pin 57 projecting laterally therefrom, the function of these pins being hereinafter explained.

Drive mechanism

Any suitable power may be used for operating the machine and in the embodiment of the invention shown, a motor M is mounted on the partition 29 and extends outwardly through one of the side walls of the casing. The motor shaft 65 operates gearing 66, 67, 68 and 69, the gear 69 being rotatably mounted on a shaft 70. (See Fig. 11.)

Gear 69, however, is not keyed to the shaft but as shown in Figs. 2 and 4 is connected thereto by means of a clutch comprising a ratchet 71 formed on the gear and a pawl 72 carried by a disk 73, the disk being pinned to the shaft as shown at 74. (See Fig. 2.) The movement of the pawl 72 into operative relation with respect to the ratchet 71 is controlled by a plate 75 rotatably mounted on the hub of the disk 73 and having an inclined cam slot 76 which receives a pin 77 secured to and extending laterally from the pawl 72. The plate 75 is resiliently moved in one direction by a spring 78, one end of the spring being secured to the disk 73 and the other end being secured to the plate 75.

Plate 75 has formed thereon a lug 79 which extends outwardly therefrom into the path of a latching lug 80 carried by an arm 81 which in turn is carried by a shaft 82. Shaft 82 is squared as shown at 83 throughout a portion of its length and the squared portion has mounted thereon a pair of arms 84. The arms 84 at their opposite ends carry a spindle or shaft 90 which is disposed below and in the path of movement of arms 51.

When the control bars 45 and arms 51 are depressed in the manner above described, the shaft 90 is engaged by arms 51 and depressed and the depression of the shaft causes the depression of the free ends of the arms 84 thereby rotating the shaft 82 in a clockwise direction to an extent sufficient to cause the latch 80 to release the lug 79 carried by the plate 75. When this lug is released from the latch, the plate 75 will be swung in a counter-clockwise direction (see Fig. 4) causing the pin 77 carried by the pawl 72 to travel downwardly in the slot 76 or toward the axis of the plate and into operative position with respect to the rachet 71.

The spindle or shaft 90 is non-positively retained in its upper and lower positions by means of latches 85 pivoted at 86 and resiliently actuated in one direction by springs 87. The latches 85 are provided with a pair of notches 88 and 89 for retaining the spindle in its two positions of movement.

*Lock mechanism*

Means is provided for throwing out the pawl and ratchet clutch and for locking the keys against operation when the ticket strip has been used and the machine is empty.

This means is illustrated in Fig. 4 and comprises a lever 250 pivoted at 251 and having a roller 252 at one end engaging a cam 253 formed on the periphery of disk 73. The roller is maintained in engagement with the cam by a spring 254 which tends to swing the lever in a clockwise direction about its pivot 251. The other end of lever 250 engages rod or shaft 90.

Rod 90 has mounted thereon a feeler bar 255 which is slidable in a guide 256 and has a hook or lug 257 at its upper end.

The cam and lever reciprocate the bar 255 up and down, each revolution of the disk 73 and cam 253.

Figure 5:
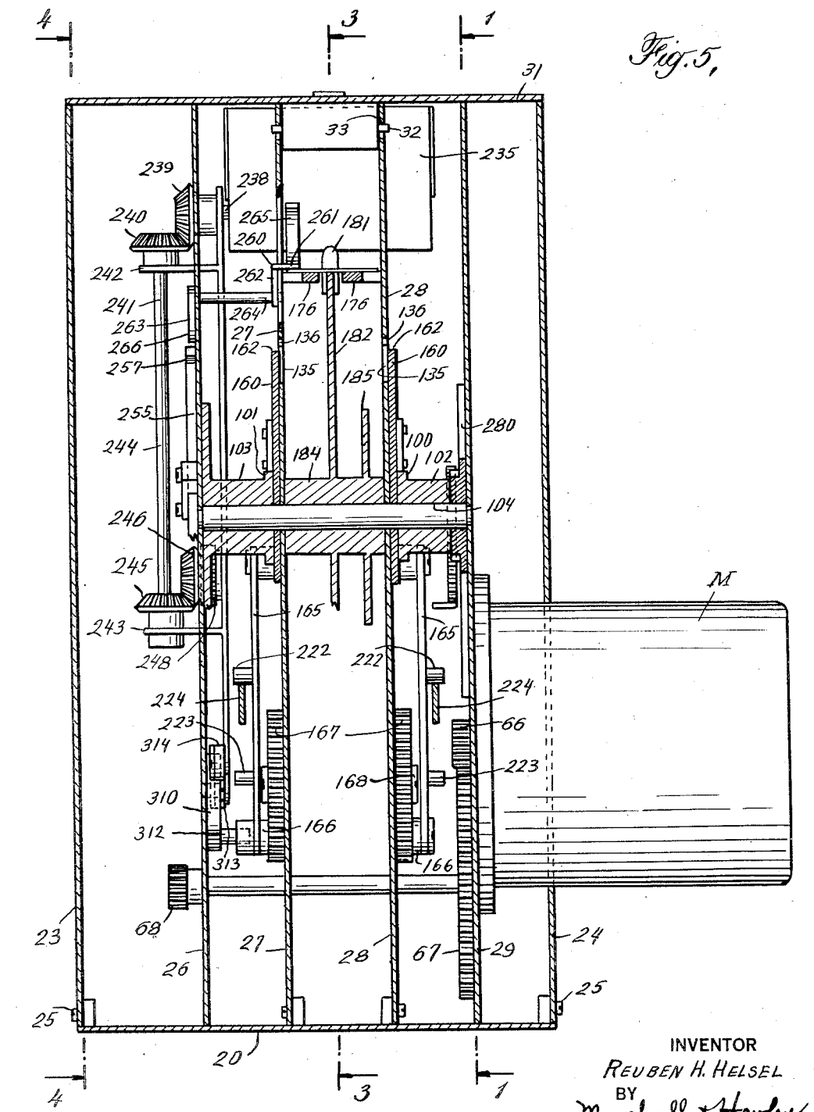
Fig. 5 is a sectional elevation taken substantially on line 5—5 of Fig. 1.

As shown in Figs. 4 and 5 a detector 260 is provided with a projection 261 that normally rests on the ticket strip and is maintained in elevated position thereby. The detector consists of two arms 262 and 263 connected by a rod 264 pivoted in frame members 26 and 27.

A finger grip or handle 265 is connected to projection 261. The arm 263 has a hook 266 on its free end adapted to extend into the path of hook 257 when the strip is exhausted and the arms 262 and 263 are permitted to drop.

*Operation of lock*

When the arms 262 and 263 of the detector 260 drop, the hook 266 will engage the hook 257 and hold the bar 255 in elevated position, thus causing lug 80 to throw out the clutch. Also the rod 90 will be elevated and will prevent depression of bars 51, thus preventing any further operation of the selector keys until a new ticket strip is placed in the machine.

As described in the next paragraph, the elevation of rod 90 will also disconnect the source of power from the motor.

*Motor control*

The motor circuit is normally open but is automatically closed upon the depression of one of the keys in the following manner.

Figure 11:
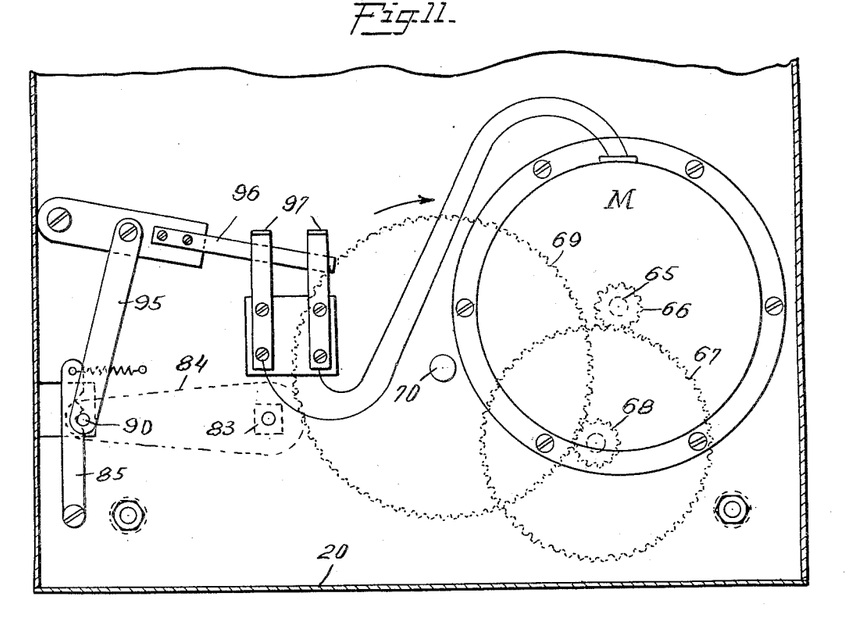
Fig. 11 is a sectional detail view showing the motor and switch for controlling the motor and operating means for the switch.

As shown in Fig. 11, the spindle or shaft 90 has mounted thereon a link 95 which is connected at its upper end to a knife switch having a blade 96 and contact terminals 97. This switch controls the power circuit for the motor and when the switch is closed, the motor is operative. Thus it will be seen that as the key is depressed, thereby depressing the control bar, arm 51 and shaft 90, the motor switch is closed and the motor begins to operate. The depression of the shaft 90 also causes the pawl 72 to move into operative relation with respect to ratchet 71, thereby connecting the shaft 70 to the motor-actuated spring.

The elevation of the spindle or rod 90 by the locking mechanism will open the switch 96 and stop the motor.

*Punch mechanism*

Punch mechanism is provided for each set of selector keys. The punch mechanisms, as shown particularly in Figs. 1 and 9, comprise arms 100 and 101 carried by hubs or sleeves 102, 103 on a shaft 104. A spring 105 is connected to each arm and tends to swing the arm about its pivot in a clockwise direction. Each arm 100 has an inwardly extending lug 106 provided with a perforation 107 to receive the punch and each arm also has slidably mounted thereon by a pin and slot connection 108 a punch frame 109. The punch frame 109 has an angular extension 110 at one end which carries the punch 111 and the punch is guided in its reciprocatory movement by a lug 112 formed on the arm 100 and spaced from the lug 107 to permit the passage of the ticket 113 between these two lugs.

Figure 9:
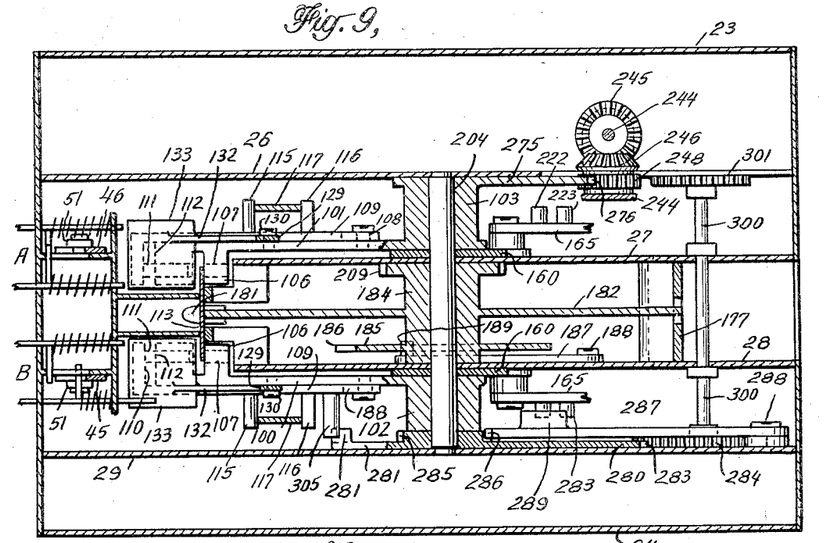
Fig. 9 is a sectional elevation taken substantially on line 9—9 of Fig. 1 and illustrating particularly the punch mechanism.

Each punch frame 109 has secured thereto and extending laterally therefrom a pair of lugs 115 and 116. These lugs as shown in Figs. 1 and 9 are positioned on opposite sides of an arm 117 of a lever 118 pivoted at 119 and adapted to control the actuation and retraction of the punch.

Each of the arms 117 of the levers is connected by a pin and slot connection 120, 121 to an arm 122 pivoted at 123. Each lever 118 is normally swung about its pivot in an anti-clockwise direction by means of a spring 124.

Figure 3:
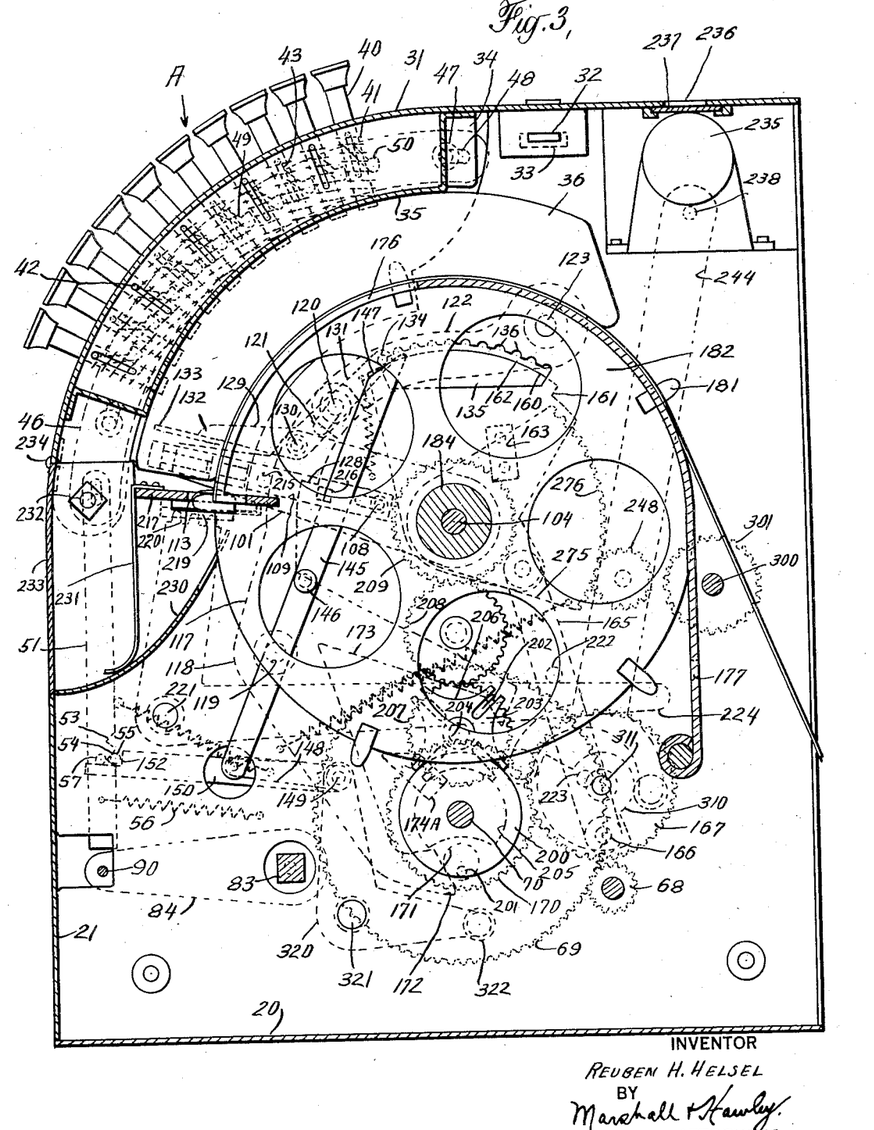
Fig. 3 is a sectional side elevation taken substantially on line 3—3 of Figs. 2 and 5.

The inner surface of each arm 117 is provided with a recess or cut-away portion 128 which as shown in Fig. 3 is normally positioned opposite the lug 116, this being the relative position of these parts when none of the keys has been depressed. When, however, one of the keys, as the key "55", has been depressed, as shown in Fig. 1, the lug 116 of the punch controlled by that set of keys is disposed in position to be actuated by the lever 118.

*Punch lock mechanism*

Each of the punch mechanisms is normally locked in inoperative position as the position shown in dotted lines in Fig. 3. In order to lock each punch mechanism in inoperative position, there is pivotally mounted at 130 on each of the arms 100, 101 a bell crank lever 129 having an upwardly extending arm 131 and a laterally extending arm 132. A plate 133 is secured to each arm 132 and is adapted to be engaged by a depressed key as shown in Fig. 1.

Each arm 131 has secured adjacent the upper end thereof a laterally and inwardly extending lug or pin 134, these pins extending into slots 135 formed in the partitions 27 and 28. (See Fig. 3.) The upper edges of these slots are provided with a plurality of recesses 136, one recess being provided for each amount, or each key of each of the sets of keys and an additional recess in each key being provided for holding the punch in inoperative position.

A spring 140 engage the arm 131 of each bell crank lever and tends to swing the lever in a direction to release the pin 134 from the recesses.

Two separate means are provided for holding the pin of each bell crank in one of the recesses of the slot.

In Fig. 3 there is shown a lever 145 pivoted at 146 and having its upper end 147 disposed in a position to engage one of the pins 134 and force this pin upwardly into the left hand recess.

The lower end of the lever 145 has connected thereto a link 148 which in turn is pivoted at 149 to a link 150. The link 150 is supported by a spring 151 which tends to move the link laterally to the left (as shown in Fig. 1). The end of the link 150 is provided with a notch 152 adapted to engage and receive either pin 55 or pin 57. When the keys of one set are all disposed in retracted position or in position to be operated as shown in Fig. 3, the notch 152 of the arm 150 will engage pin 55, thus holding the upper end 147 of the lever 145 associated with the group of keys of the set under consideration in position to retain the locking pin 134 of the bell crank lever 129 corresponding with that set of keys in locking position.

When one of the keys is depressed, as shown in Fig. 1, thus depressing the bar 51 corresponding to that set of keys, the link 150 will be forced downwardly and will be pulled to the left by the spring 151, thus swinging the lever 145 in a clockwise direction about its pivot and releasing the locking pin corresponding to the set of selector keys which includes the depressed key.

Another lock is also provided, this lock consisting of a sector 160 pivoted as shown in Fig. 5 on the shaft 104. Each sector has a notch 161 at one end thereof and has an arcuate portion 162 adapted to be positioned beneath the pin 134 and prevent the release of the pin from one of the recesses 136. Each sector 160 also has secured thereto a lug 163 (see Fig. 1) adapted to engage the punch arm 100 or 101 and return the punch arm to initial position as hereinbefore described.

Each sector is actuated at each operation of the machine by means of a link 165 eccentrically connected at 166 to a gear 167. A gear 167 is provided for each set of selector keys, one of the shafts 168 being mounted on the partition 27 and the other being mounted on the partition 28. The gears 167 are driven by gears 170 which are mounted on and driven by the shaft 70. Thus at each revolution of the gears 167, the sectors 160 will be oscillated and when the sectors are so positioned that the notches 161 therein are disposed beneath the locking pin 134, the pins can be released from the recesses 136. The operations are so timed that when a key is depressed, the sector will be swung in an anti-clockwise direction immediately to release the locking pin 134 controlled thereby, permitting the punch mechanism to swing upwardly until it engages the depressed key whereupon the locking pin 134 will enter the recess corresponding to the first key and will be locked therein by the sector which is returned to its locking position.

*Punch operating means*

The shaft 70 as above stated has secured thereto a pair of gears 170 and each gear carries a roller 171 adapted to engage the lower end 172 of lever 118 and swing the lever in a clockwise direction about its pivot thereby forcing the arm 117 of the lever and the arm 122 inwardly to actuate the punch mechanism providing the punch mechanism has moved up into engagement with a depressed key.

Each lever 118 also has formed thereon a laterally extending arm 173 adapted to be engaged by a lug 174 which is also carried by the gear 170. The roller 171 actuates the lever mechanism to operate the punch and the engagement of the lug 174 with arm 173 returns the lever to its initial position.

*Locking mechanism and feeding mechanism for check strip feed*

Figure 8:
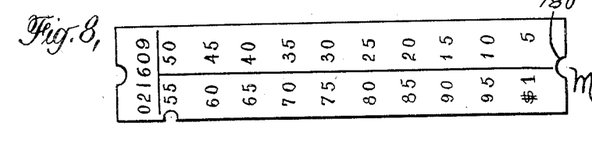
Fig. 8 is a plan view of a ticket issued by the machine.

The checks or tickets may be drawn from a feed roll or from a zig-zag supply package and the strip has formed therein at each end of each check, a perforation, a portion of these perforations being shown at 180 in Fig. 8. These perforations receive peripheral lugs or pins 181 carried by the outer periphery of a central disk 182 rotatably mounted on the shaft 104. During the passage of the strip through the machine and the feeding of the strip by the disk, the strip is supported on surfaces 176 carried by a supporting member 177. The hub 184 of the disk 182 has fixed thereto a disk 185 having radial notches 186 formed therein as shown in Fig. 1.

In order to lock the disk 182 against movement during the punching operation and during the cutting operation, a lever 187 is pivoted at 188 to a fixed pivot carried by the partition 28 and a stud 189 is mounted on one end of the lever and is positioned to enter the notches 186 of the disk 185.

The movement of the lever 187 is controlled by means of a cam 190 having a circular or cylindrical portion 191 upon which a roller 192 carried by the free end of the lever 187 rides during the major portion of the cycle of movement of the parts to retain the stud 189 in one of the slots 186 of the disk 185 and lock the disk 185 and disk 182 against movement. However, when the punch mechanism has been operated and it is desired to feed the check strip and sever the punched check, the roller 192 under the actuation of a spring 193 will engage a projecting portion 195 of the cam 190, thereby causing the lever 187 to move in a counter-clockwise direction, releasing the stud 189 from the notch 186 and permitting the rotation of the disks 182 and 185.

When the locking means for the disk has been released in the manner just set forth, disk rotating means is brought into operation in the following manner. A disk 200 is fixed to the shaft 70 and carries on one face adjacent its periphery a pin 201 adapted to enter at a predetermined point in the cycle of operation of the parts one of the four radial notches 202 formed in a Geneva wheel 203 rotatably mounted on a stud 204 carried by the partition 27. The disk 200 also has secured thereto a disk 205 so formed as to cooperate with the recessed arcuate portions 206 of the Geneva wheel in the well known manner to prevent rotation of the wheel except when the pin 201 is in operative position in one of the notches 202. A gear 207 is secured to the Geneva wheel 203 and is rotated therewith and this gear is connected through an idler gear 208 to a gear 209 mounted on the hub 184 of the disk 182. The parts are so timed that when the disk 182 has been released from its lock, the Geneva wheel will be operated to rotate the disk and feed the check strip a distance corresponding to the length of one check. When the check strip has been so fed, the cutting or severing mechanism is brought into operation in the following manner.

*Check severing means*

Figure 10:
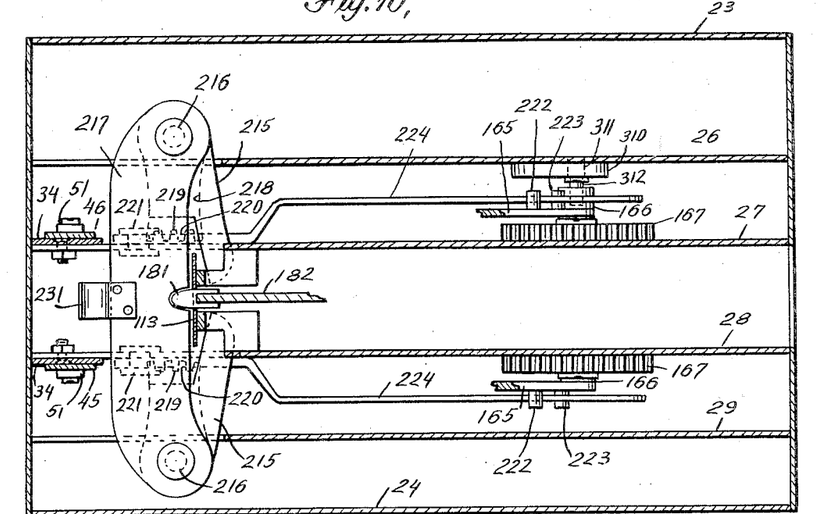
Fig. 10 is a view similar to Fig. 9 taken substantially on line 10—10 of Fig. 1, showing the cutting or check severing mechanism.

The check cutting or severing mechanism is illustrated particularly in Figs. 1 and 10. The cutting means consists of a pair of knives or blades 215 pivotally mounted at 216 to opposite ends of a plate 217 carried by the machine frame. The knives 215 are spaced apart at their free ends and operate on the portions of the check strip extending laterally from the perforations 180 therein. In the form of the invention illustrated, each knife has connected thereto a sector 218 having teeth meshing with teeth 219 formed at the upper end of a bell crank lever 220 pivoted at 221.

Each bell crank lever 220 is actuated to operate the cutting knives by means of a pair of laterally projecting lugs 222 and 223 which are carried by the links 165 and are disposed on opposite sides of the arm 224 of bell crank lever 220. As either of the links 165 is oscillated by the rotation of the gear connected thereto, the bell crank lever 220 controlled thereby will be oscillated about its pivot 221 and the operations of the parts are so timed that the strip will have been punched and will be in position for cutting when the lug 223 engages and swings the bell crank lever 220 in an anti-clockwise direction. The lever will be returned to its initial position by the lug 222, thus retracting the knives.

It will be understood that two bell crank levers are provided, one for each set of selector keys so that when the machine is set in operation by the depression of a key in either set, one of the bell crank levers will be ac-

Counter mechanism

In connection with the check punching and feeding mechanism above described, means is provided for indicating the total amount covered by the checks or tickets issued by the machine.

The counter itself may be of any desired form and is indicated at 235 in Figs. 1, 3, 4 and 5 of the drawings. A slot 236 is provided in the cover 31 for observing the figures of the counter and a window 237 is interposed between the slot or opening 236 and the counter.

The counting mechanism is driven in any suitable manner from shaft 238 on the outer end of which is mounted a bevel gear 239 which meshes with a bevel gear 240. The gear 240 is secured to the upper end of a shaft 241 mounted in lugs 242 and 243 which are carried by and extend laterally from an arm 244 which is pivotally supported on and is adapted to swing about the shaft 238. A bevel gear 245 is secured to the lower end of the shaft and meshes with a bevel gear 246 carried by a spindle 247 which in turn is supported on the arm 244. The spindle 247 also has secured thereto a spur gear 248 which is adapted to be driven in the following manner.

As hereinbefore stated, the selector keys as shown in Fig. 7 are divided into two groups, namely, group A and group B. The keys in group A register amounts ranging from 5¢ to 50¢ inclusive and the keys in group B register amounts ranging from 55¢ to $1.00 inclusive.

One set of driving means is provided for operating the counter when any one of the keys in group A is depressed and another set of driving connections is provided for operating the counter when a key in group B is depressed.

The operative connections for rotating the counter when a key in group A is depressed will first be described.

As shown in Fig. 9, the hub or sleeve 103 which carries the arm 101 of the punch mechanism for the selector keys in group A, has secured thereto and extending therefrom in a direction opposite to the arm 101, a sector 275 (see Figs. 4 and 9). The sector 275 has teeth 276 which mesh with the spur gear 248 on the spindle 247.

Thus, as one of the keys in group A is depressed and the punch mechanism is released and swings to a position in which it is arrested by the depressed key, the sector 275 will swing about the shaft 104 a corresponding amount, thus rotating the gear 248 and the bevel gears 246, 245, 240 and 239, thereby rotating the counter drive shaft 238 and causing the counter mechanism to indicate the amount punched on the ticket or check by reason of the depression of the key.

In order to operate the counter to indicate an amount corresponding to a key in group B, it is necessary to cause the counter to rotate an amount greater by fifty (50) than is necessary when a key in group A is depressed. This is accomplished in the following manner.

As shown in Fig. 1, a sector 280 is pivoted on the shaft 104 and is provided at one side of the center thereof with an arm 281 having an offset lug 282 formed thereon. Teeth 283 are formed on the sector 280 on the opposite side of the center from the arm 281 and the sector teeth mesh with a gear 284. The sector 280 also has formed thereon concentric with the shaft 104 a gear 285 which in turn meshes with teeth 286 of a sector 287 pivoted at 288. The sector 287 has formed thereon a laterally extending lug 289 which is disposed in the path of lug 222 carried by arm 165, which oscillates the sector 160 back and forth. A spring 290 is connected to the sector 287 and normally tends to swing this sector in an anti-clockwise direction about its pivot 288. The sector 287 is, however, prevented from actuation by the spring in the manner hereinafter explained.

When none of the keys in group B is depressed and the punch operating mechanism is in its position of rest and the punch mechanism is held in inoperative position, the lug 282 of the arm 281 is positioned beneath a latching lug 295 formed on the upper end of the bell crank lever 296 pivoted at 297. The opposite end of the bell crank lever has mounted thereon a roller 298 so positioned that it will be engaged at the proper period in the cycle of operation of the machine by lug 174, thus swinging the bell crank lever in a clockwise direction to reset the latch 295 after the operation of the counter mechanism hereinafter described. The latch lug 295 is released from the lug 282 of the arm 281 of the sector 280 in the following manner.

As shown in Fig. 1, the pivot 149 for the links 148 and 150 is located on the upwardly extending portion of the bell crank lever 296 and the spring 151 which is connected to the link 150 tends to swing the bell crank lever to the left. Thus, when the link 150 upon the depression of one of the keys, moves from the position shown in Fig. 3 or in which the pin 55 is disposed in notch 152 of the link 150 to the position shown in Fig. 1 in which pin 57 is disposed in the notch 152, the bell crank lever will be swung in an anti-clockwise direction about its pivot a sufficient extent to release the latching lug 295 from engagement with the lug 282 whereupon the spring 290 which is connected to sector 287 will cause the sector 280 to swing about its axis in a clockwise direction, thus rotating the gear 284 in an anti-clockwise direction. As the sector 287 is rotated by the spring 290, the gear 285 will also be rotated and thus the sector 280 will be rotated in a clockwise direction.

The gear 284 is mounted on a shaft 300 on the opposite end of which is mounted a gear 301 adapted to mesh with gear 248 mounted on the shaft 247 carried by the arm 244 when this arm is swung in a manner hereinafter described to a position in which the gear 301 and gear 248 will mesh. The gear 248 during this rotation can rotate freely since as shown in Fig. 4, the gear 301 at this period in the cycle of operation does not mesh with the gear 248. The amount of rotation is determined by the position of the punch arm 100 since this arm carries a stud 305 positioned in the path of movement of the lug 282. Since the movement of the punch arm is controlled by the key depressed, the amount of rotation of the sector 280 and of the gears 284 and 301 will also be correspondingly controlled and this rotation of the gears 284 and 301 takes care of the difference in amounts between the selector keys in group B and the keys in group A.

After the gears 284 and 301 have been rotated as described, the arm 244 will be swung about its pivot on the shaft 238 to cause the gear 301 to mesh with the gear 284. This is accomplished in the following manner.

A cam 310 is mounted on a pivot stud 311 secured to the partition 26 and has a pin 312 projecting laterally therefrom and disposed in alinement with and extending into the crank pin 166 which connects the gear 167 mounted on the partition 27 to link 165. Thus, as the crank pin 166 and gear 167 rotate, the cam 310 will also be rotated.

The lower end of the arm 244 is bifurcated as shown in Fig. 4 and rollers 313 and 314 are secured to the ends of the bifurcated portions. The bifurcated ends of the arm 244 straddle the cam 310 and the rollers engage the cam and by reason of their engagement, the arm 244 is oscillated back and forth as the cam rotates.

The operations are so timed that after the gears 284 and 301 have been rotated an amount corresponding to the amount indicated on the depressed key of group B, the gear 248 will be swung with the arm 244 into engagement with the gear 301.

At this period in the operation, the link 165 will be moving upwardly and with it the lug 222 and this lug will engage the lug 289 carried by the sector 287 and swing this sector in a clockwise direction about its pivot. As the sector 287 is thus swung about its pivot, the gear 285 will be rotated in an anticlockwise direction carrying with it the sector 280 which in turn will cause rotation of the gear 284 in a clockwise direction, thus rotating the shaft 300 and gear 301. Since the gear 248 now meshes with the gear 301, the counter mechanism will be rotated to add to the total the amount indicated by the depressed key.

The counter mechanism operation last described, functions in connection with group B of the selector keys and the bell crank 296, sector 280 and other parts described operate only in connection with the keys of group B.

As shown in Fig. 3, the pivot 149 of the links 148 and 150 associated with group A of the selector keys is connected to a bell crank lever 320 pivoted at 321 and having a roller 322 adapted to be engaged by lug 174A to reset the latch 147 and move the link 150 to the left. This operation takes place as the punch mechanism is returned to its position of rest and the bar 51 and slide bar 45 are returned to their initial position, thus permitting the key which has been depressed to move outwardly to operative position.

The front wall 21 of the casing has formed thereon an inwardly extending inclined support 230 for receiving the severed check and a spring clip 231 is secured and carried by the plate 217 for retaining the severed check.

The cover 31 of the casing is pivoted at 232 and has a leaf or door 233 hinged thereto as shown at 234, the lower edge 235 of the door being spaced from the upper end of the front wall 21 of the casing to give access to the severed check.

Resetting operation

After a key has been depressed, the punch mechanism has moved to operative position and has been operated, the check strip has been fed the length of one check and the check punched has been severed and the counter mechanism has been operated to add to the total the amount punched on the check, the various parts are returned to their initial position in the following manner.

As hereinbefore described, the cam 253 which is formed on the periphery of the disk 73, actuates the lever 250 once every revolution. This actuation of the lever is timed to take place at the completion of the operations set forth in the preceding paragraph.

Figure 6:
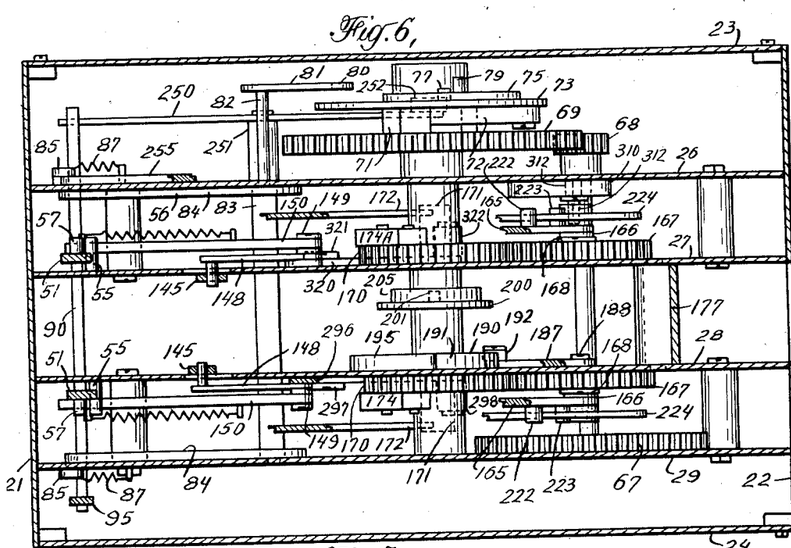
Fig. 6 is a sectional elevation taken substantially on line 6—6 of Fig. 1.

As the lever 250 is actuated, the rod 90 which as shown in Fig. 6 extends across the machine and beneath both of the bars 51, will be raised, thus raising the bars 51 which in turn raise the control bars 45, releasing the depressed key or keys. As the bars or links 51 are elevated, the link or links 150 will also be moved to the left and the pin or pins 55 will be disposed in the lower notches 54 of the bars 51 and the notches 152 of the links 150 will also engage the pins 55. This will permit the locking levers 145 to again lock the pins 134 in the left hand recesses 136, thus retaining the punch mechanism in inoperative position. The punch mechanism is returned to inoperative position by the engagement of the lugs 163 with the punch arm as the lug swings in a clockwise direction about the pivot of the sector 160.

It will be understood that after a key in each set is depressed, both sets of mechanism will be reset, whereas if only one key is depressed, the mechanism controlled by that key will be reset.

As the rod 90 is elevated, the arm 81 will be swung in an anti-clockwise direction, thus positioning the latching lock 80 in the path of pin 79 carried by plate 75. This operation will cause the pawl 72 to move out of engagement with the ratchet 71, thus disconnecting the motor drive from the operative mechanism.

Summary of operations

In summarizing the operations of the various mechanisms of the machine, the operations of the two sides of the machine controlled by the two sets of selector keys will be outlined separately since in certain respects, particularly with reference to the counter mechanism, the operations of the two sides differ.

Operations controlled by keys of group A

When a key in group A is depressed, the control bar associated with this group of keys will also be depressed and the bar 51 connected to the control bar will be moved from its upper to its lower position. The depression of the bar 51 will cause the link 150 to move to the position shown in Fig. 1, thus releasing the locking lever 145 from engagement with the pin 134.

As the bar 51 is depressed, the rod 90 will also be depressed, thus swinging the arm 81 downwardly and releasing the pin 79 from the latch lock 80. This permits the pawl 72 to engage the ratchet 71 and the depression of the rod 90 also closes the motor switch 96, causing the operation of the motor. As the pawl 72 engages the ratchet 71, the shaft 70 will be rotated by the motor driven gearing between the motor shaft and the gear 69.

When the motor is started and the gearing is rotated, the gear 167 will also be rotated, thus swinging the sector 160 to the left (viewing Figs. 1 and 3), positioning the notch or recess 161 beneath the pin 134. The bell crank lever 129 will then swing about its pivot under the action of spring 140 and the punch mechanism will swing upwardly by reason of the action of a spring 105. The upward movement of the punch mechanism will be arrested by the depressed key whereupon the pin 134 will be swung upwardly into the recess 136 corresponding to the key which has been depressed. The pin will be locked therein by the segment 162 which will then have returned to locking position. When the punch mechanism has moved to operative position in the manner just described, the lever 118 will be actuated by roller 171 to operate the punch. When the punch has been operated, the cutting knives will be operated by lug 223 carried by arm 165 to sever the punched check.

During the operations just described set in motion by the depression of a key in group A, the counter mechanism will be operated to add to the total therein the amount punched in the check. This is accomplished by the rotation of sector 275 by reason of its connection to the punch supporting arm 101. The sector meshes with gear 248 which is operatively connected in the manner hereinbefore described, to the counter.

The parts operated in the manner above described are reset by the engagement of lever 250 which is actuated by cam 253 with the rod 90. As the lever is actuated by the cam, the rod will be raised, thus returning the bar or link 51 and the control bar to their initial positions, thereby permitting the depressed key to be forced out under the action of the spring operating thereon.

The punch operating mechanism will be returned to its normal position, after its actuation by roller 171, by the spring 124 and as the actuating mechanism returns to the position shown in Fig. 1, the punch will be moved outwardly by the engagement of the arm 117 with the pin 115. The cutting knives will be returned to their initial position by engagement of lug 223 with the lower edge of the arm 224 of the bell crank lever 220.

The operation of the strip feeding disk 182 and the locking of this disk in position has already been fully described and further description thereof is not deemed necessary.

The link 150 will be returned to its initial position by reason of the engagement of roller 322 on lever 320 by lug 174A.

The raising of the rod 90 will also in the manner hereinbefore set forth cause the pawl 72 to move out of engagement with the ratchet 71 and will open the motor circuit, thus stopping the operation of the motor.

Operations controlled by keys of group B

The operations set in motion by the depression of a key in group B are the same as those set in operation by the depression of a key in group A as to the punch mechanism, strip feed and strip severing mechanism. The operation of the counter mechanism, however, differs from its operation occasioned by the depression of a key in group A.

When a key in group B is depressed and the punch mechanism swings up to the position shown in Fig. 1, the sector 280 will be swung in a clockwise direction until the lug 282 engages the pin 305 in the manner hereinbefore set forth. This will cause an initial rotation of gear 284 and gear 301; thereafter, lug 222 will engage lug 289 on the sector 287 and rotate the gear 285 and sector 280, gear 284 and gear 301 in the opposite direction. During this operation, the gear 301 will mesh with the gear 248, thus rotating the shaft which operates the counter mechanism.

The locking mechanism shown in Fig. 4 will operate to lock the keys of both sets against operation whenever the strip of tickets or checks is exhausted. The operation of the lock has been fully described in the foregoing specification and, therefore, further description of this operation is not deemed necessary.

From the foregoing specification it will be seen that each set of keys sets in motion the operation of punch mechanism, ticket severing mechanism and counter mechanism and after the depression of a key, the operation of the device is automatic and the punching, feeding and cutting mechanisms will complete their cycles of operations and the counter mechanism will be operated to add to the total the amount punched on the check without further attention by the operator.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A check punching machine comprising means for supporting a check, check punching mechanism movable to various positions with respect to said check supporting means, a plurality of selector keys adapted to form stops for limiting the movement of said check punching mechanism and to position said mechanism at predetermined points with respect to the check supporting means, and means set in operation by the actuation of any one of said selector keys for operating said punching mechanism.

2. A check punching machine comprising a check supporting surface, a check punching mechanism movable relative thereto, means for moving said check supporting mechanism to various positions with respect to said check supporting surface, means for latching said mechanism against movement, a plurality of selector keys constructed and arranged to limit the movement of the punching mechanism with respect to the check supporting surface and means controlled by said keys for releasing said latching means.

3. A check punching machine comprising a check supporting surface, punching mechanism movable relative thereto, means for holding said mechanism in inoperative position, means for moving said mechanism to operative position and a plurality of selector keys reciprocably mounted in said machine, each of said keys being adapted when moved to operative position to form a stop for limiting the movement of said punching mechanism and means controlled by said selector keys for releasing said punching mechanism whereby said mechanism will be moved to a predetermined operative position with respect to said check supporting means.

4. A check punching machine comprising means for supporting a check, check punching mechanism movable to various positions with respect to said check supporting means, a plurality of selector keys adapted to form stops for limiting the movement of said check punching mechanism and to position said mechanism at predetermined points with respect to the check supporting means, and means controlled by said keys for operating said punching mechanism.

5. A check punching machine comprising a check supporting surface, check punching mechanism movable relative thereto, means for moving said check punching mechanism to various positions with respect to said check supporting surface, selector keys for limiting the movement of said punching mechanism, means for latching said mechanism against movement, means controlled by said keys for releasing said latching means, and operating means for said punching mechanism controlled by said keys.

6. A check punching machine comprising a check supporting means, punching mechanism movable to various positions with respect thereto, a plurality of depressible keys, each key being adapted when depressed to form a stop for limiting the movement of said punching mechanism, key controlled means for moving said punching mechanism to a predetermined position upon the depression of a key and means set in operation by the depression of said key for operating said punching mechanism.

7. A check punching machine comprising a check supporting means, punching mechanism movable with respect thereto, means for moving said punching mechanism along said check supporting means, latching means for retaining said mechanism against movement and a selector key adapted when depressed to limit the movement of said check supporting means and means controlled by said key for operating said punching mechanism.

8. A check punching machine comprising check supporting means, check punching mechanism movable relative thereto, means for moving said punching mechanism, means for actuating said punching mechanism and a plurality of selector keys so constructed and arranged that the operation of any one of said keys will cause the movement of the punching mechanism to a predetermined position with respect to the check supporting means and means controlled by said selector keys for operating the actuating mechanism for the check punching mechanism.

9. A check punching machine comprising means for supporting a check strip, check punching mechanism movable with respect to said supporting means, means for moving said check punching means along said support, latching means for retaining said punching mechanism against movement, a plurality of selector keys, means controlled by said keys for releasing said latching means, and means controlled by said keys for operating said punching mechanism.

10. A check punching and feeding machine comprising means for supporting and feeding a strip of checks, locking means for retaining said feeding means against movement, punching mechanism movable to predetermined positions with respect to said strip supporting and feeding means, a plurality of selector keys movable into the path of movement of said check punching mechanism and adapted to position said mechanism in predetermined positions with respect to said strip supporting and feeding means, means for retaining said punching mechanism against movement and means controlled by said selector keys for releasing said punching mechanism and for releasing the locking means for said strip supporting and feeding means.

11. A check punching and feeding machine comprising means for supporting and feeding a strip of checks, punching mechanism movable to a plurality of positions with respect to said supporting and feeding means, strip severing means, a plurality of selector keys and a plurality of means controlled by said selector keys for operating said punching mechanism, feeding said check strip and severing said strip.

12. A check punching and feeding machine comprising means for supporting and feeding a strip of checks, punching mechanism movable with respect thereto, means for moving said punching mechanism, latching means for retaining said punching mechanism against movement, a plurality of selector keys constructed and arranged to form stops for limiting the movement of the check punching mechanism and means controlled by said selector keys for releasing the latching means, for operating said punching mechanism and for feeding said check strip.

13. A check punching machine comprising means for supporting a check, a plurality of sets of keys, punching mechanism for each set of keys movable to a plurality of operative positions relative to said check supporting means and means set in operation by the actuation of a key in either set of keys for operating the punching mechanism for said set of keys.

14. A check punching and issuing machine comprising means for supporting and feeding a check strip, punching mechanism movable relative to said supporting means, a plurality of selector keys, each of said keys when actuated being adapted to form a stop for limiting the movement of said punching mechanism, means for operating said punching mechanism, means for operating the check strip feeding mechanism after a check has been punched, means for severing a check from the check strip after the strip has been fed and a plurality of means controlled by said selector keys for controlling the operation of said punching mechanism, check strip feeding means and check severing means.

15. A check punching and issuing machine comprising means for supporting and feeding a check strip, punching mechanism movable relative to said supporting means, a plurality of selector keys, each of said keys when actuated being adapted to form a stop for limiting the movement of said punching mechanism, means for operating said punching mechanism, means for operating the check strip feeding mechanism after a check has been punched, means for severing a check from the check after the strip has been fed, a plurality of means controlled by said selector keys for controlling the operation of said punching mechanism, check strip feeding means and check severing means, and means for returning said punching mechanism, operating means for the punching mechanism, check severing means and selector key to initial position after completion of the cycles of movement thereof.

16. A check punching and feeding machine comprising means for supporting and feeding a check strip, punching mechanism disposed to operate on each edge of a check strip supported by said supporting and feeding means and a set of selector keys adapted to control the operation of each punching mechanism.

17. A check punching and feeding machine comprising means for supporting and feeding a check strip, punching mechanism disposed to operate on each edge of a check strip supported by said suppotring and feeding means, a set of selector keys adapted to control the operation of each punching mechanism, and means operable upon the side edge portions of the check strip for severing a check from said strip.

18. A check punching and feeding machine comprising a rotatable member, a plurality of radially extending lugs carried by said member and adapted to extend through spaced perforations in a strip of material, means for actuating said feeding means to feed a strip and a pair of check severing means disposed at the edges of the strip and operable from the outer edges of the strip toward the center and upon the portions thereof disposed laterally from the perforation therein for severing a check from the strip.

19. A check punching and feeding machine comprising means for supporting and feeding a check strip, punching mechanism movable relative to said supporting means, a plurality of selector keys adapted to limit the movement of said punching mechanism relative to said supporting means, means for operating said punching mechanism, a motor, an operative shaft, gearing connected to said motor, operative connections between said shaft and said punch operating means and between said shaft and said check strip feeding means, and means controlled by said selector keys for operatively connecting said operating shaft and said motor-operated gearing upon the depression of one of said keys.

20. A check punching and feeding machine comprising means for supporting and feeding a check, punching mechanism adapted to operate on a check supported thereby, a motor, an operating shaft, means carried by said shaft for operating said punching mechanism, a plurality of selector keys, and means including a clutch controlled by said selector keys for operatively connecting said motor and said shaft.

21. A check punching and issuing machine comprising means for supporting and feeding a check strip, punching mechanism adapted to operate on a check supported thereby, cutting means adapted to sever a check from the check strip, an operating shaft, means for driving said shaft including a clutch, means carried by said shaft for operating the punching mechanism, check strip feeding means and cutting means, a plurality of selector keys constructed and arranged to set in motion said shaft operating means and to control the clutch between said means and said shaft in a manner to connect the shaft to said operating means.

22. A check punching and issuing machine comprising means for supporting and feeding a check strip, punching mechanism disposed adjacent each side edge of the strip and adapted to punch out portions of the strip disposed on opposite sides of the longitudinal center thereof and a set of selector keys adapted to control the operation of each of said punching mechanisms.

23. A check punching and issuing machine comprising means for supporting and feeding a check strip, punching mechanism disposed adjacent each side edge of the strip and adapted to punch out portions of the strip disposed on opposite sides of the longitudinal center thereof, a set of selector keys adapted to control the operation of each of said punching mechanisms, and means controlled by the actuation of a key in either of said sets of keys for feeding and severing a check from said strip.

24. A check punching machine comprising a check supporting surface, a check punching mechanism movable relative thereto, means for moving said check punching mechanism to various positions with respect to said check supporting surface, means for latching said mechanism against movement, key control means for releasing said latching means, and for arresting said punching mechanism in predetermined positions with respect to said check supporting surface.

25. A check punching and issuing machine comprising means for supporting and feeding a check strip, a plurality of sets of selector keys, punching mechanism for each set of keys movable relative to said check supporting means and means set in operation by the actuation of a key in either of said sets for operating the punching mechanism for said set of keys, and for feeding said check strip.

26. A check punching and issuing machine comprising means for supporting and feeding a check strip, a plurality of sets of selector keys, punching mechanism for each set of keys movable relative to said check supporting means and means set in operation by the actuation of a key in either of said sets for operating the punching mechanism for said set of keys, for feeding said check strip and for severing a check from said strip.

27. A check punching and feeding machine comprising means for supporting and feeding a check strip, punching mechanism disposed to operate on each edge of a check strip supported by said supporting and feeding means, a set of selector keys adapted to control the operation of each punching mechanism, and means for severing a check from said strip.

28. A check punching and feeding machine comprising means for supporting and feeding a check, punching mechanism adapted to operate on a check supported thereby, a motor, an operating shaft, means carried by said shaft for operating said punching mechanism, a plurality of selector keys, and means including a clutch controlled by said selector keys for operatively connecting said motor and said shaft and disconnecting said shaft from said motor.

29. In a machine of the character described, means for supporting and feeding a strip, and strip severing means comprising a pair of separate knives disposed at the edges of the strip and operatable on the edge portions thereof to cut said portions from the outer edges toward the center of the strip.

30. In a machine of the character described, means for supporting and feeding a strip, and strip severing means comprising a pair of separate, pivoted knives disposed at the edges of the strip and operatable on the edge portions thereof to cut said portions from the outer edges toward the center of the strip.

31. In mechanism of the class described, the combination with a ticket-delivery roll, of an associated severing mechanism subdivided to span said roll.

32. In mechanism of the class described, the combination with a ticket-delivery member, of stationary and movable cutting members positioned in cooperative relation upon both sides of said delivery member; the movable cutting members being mounted to insure a progressive shearing action.

In witness whereof, I have hereunto set my hand this 21st day of November, 1925.

REUBEN H. HELSEL.